US008095538B2

(12) United States Patent
Hawking

(10) Patent No.: US 8,095,538 B2
(45) Date of Patent: Jan. 10, 2012

(54) ANNOTATION INDEX SYSTEM AND METHOD

(75) Inventor: David Hawking, Canberra (AU)

(73) Assignee: Funnelback Pty Ltd, Dickson, Australian Capital Territory (AU)

( * ) Notice: Subject to any disclaimer, the term of this patent is extended or adjusted under 35 U.S.C. 154(b) by 236 days.

(21) Appl. No.: 12/515,260

(22) PCT Filed: Nov. 8, 2007

(86) PCT No.: PCT/AU2007/001711
§ 371 (c)(1),
(2), (4) Date: May 15, 2009

(87) PCT Pub. No.: WO2008/061290
PCT Pub. Date: May 29, 2008

(65) Prior Publication Data
US 2010/0057800 A1    Mar. 4, 2010

(30) Foreign Application Priority Data

Nov. 20, 2006    (AU) .................................. 2006906464

(51) Int. Cl.
*G06F 17/30*    (2006.01)

(52) U.S. Cl. ......... 707/728; 707/711; 707/748; 707/752
(58) Field of Classification Search ........................ None
See application file for complete search history.

(56) References Cited

U.S. PATENT DOCUMENTS

| 5,953,723 | A | 9/1999 | Linoff et al. | |
| 6,618,727 | B1 * | 9/2003 | Wheeler et al. | 707/748 |
| 7,051,274 | B1 * | 5/2006 | Cottrille et al. | 715/210 |
| 7,587,407 | B2 * | 9/2009 | Gruhl et al. | 1/1 |
| 7,640,254 | B2 * | 12/2009 | McConnell | 1/1 |
| 7,702,673 | B2 * | 4/2010 | Hull et al. | 707/707 |
| 7,908,277 | B1 * | 3/2011 | Page | 707/748 |
| 2003/0145281 | A1 * | 7/2003 | Thames et al. | 715/513 |
| 2004/0186817 | A1 * | 9/2004 | Thames et al. | 707/1 |
| 2004/0243537 | A1 * | 12/2004 | Wang et al. | 707/1 |
| 2004/0243560 | A1 * | 12/2004 | Broder et al. | 707/3 |
| 2004/0267725 | A1 | 12/2004 | Harik | |
| 2004/0267798 | A1 * | 12/2004 | Chatterjee et al. | 707/102 |
| 2005/0203876 | A1 * | 9/2005 | Cragun et al. | 707/3 |
| 2005/0256825 | A1 * | 11/2005 | Dettinger et al. | 707/1 |
| 2008/0027929 | A1 * | 1/2008 | Rice et al. | 707/6 |

FOREIGN PATENT DOCUMENTS

WO    2006/071931 A2    7/2006

* cited by examiner

*Primary Examiner* — Greta Robinson
*Assistant Examiner* — James J Wilcox
(74) *Attorney, Agent, or Firm* — Barnes & Thornburg LLP

(57) ABSTRACT

A method of encoding on a computer system for information retrieval in an inverted list structure of annotation includes collecting a group of documents and storing them in a digital format, determining a group of annotations referencing the group of documents, and forming a snippet index by grouping the group of annotations by unique annotation identifier. The method also includes forming a snippet dictionary which, for each unique annotation identifier, indexes a corresponding position in the snippet index for the group of annotations having that unique annotation identifier.

16 Claims, 4 Drawing Sheets

ANNOTATION INDEX SYSTEM AND METHOD

CROSS-REFERENCE TO RELATED APPLICATION(S)

This United States Non-Provisional Patent Application is a National Stage Entry that relies for priority on PCT Patent Application No. PCT/AU2007/001711, filed on Nov. 8, 2007, and also relies for priority on Australian Patent Application No. 2006906464, filed on Nov. 20, 2006, the contents of both of which are incorporated herein by reference.

FIELD OF THE INVENTION

The present invention relates to the field of search engines and, in particular, discloses an efficient form of document indexing and retrieval based on document annotations.

BACKGROUND OF THE INVENTION

Any discussion of the prior art throughout the specification should in no way be considered as an admission that such prior art is widely known or forms part of common general knowledge in the field.

Internet search engines have become a significant part of the Internet landscape. Search engines provided by Google, Yahoo, Microsoft etc attempt to provide comprehensive and rapid search capabilities for users attempting to find information on particular topics that form part of the labyrinth of the Internet or private intranets.

These search engines normally include three main parts. The first is a gathering mechanism collecting materials that will form part of the index. The second is an indexer for comprehensively indexing the gathered material, often by keywords, to produce a readily searchable inverted index of key words or phrases. The third part is a querying process for querying the inverted index and presenting the results of the query to a user.

For example, a classic description provided by Sergey Brin and Lawrence Page, "The anatomy of a large-scale hypertextual Web search engine", in *Proceedings of WWW7*, pages 107-117. It is assumed the skilled person in the field is readily familiar with the construction of search engines.

As part of the indexing process, a relative document importance is assigned to the material that has been crawled. Various mechanisms for relative assignment are known and can depend on the perceived value of the document and the perceived importance of the words within a document. One well known technique for assigning importance is the Page Rank algorithm.

It is advantageous to a search engine that the indexer provides an efficient mechanism for indexing the crawled material, capable of supporting rapid and effective query responses.

SUMMARY OF THE INVENTION

It is an object of the present invention to provide an efficient form of indexing and retrieval suitable for use in a search engine type application.

In accordance with a first aspect of the present invention, there is provided a method of encoding an inverted list structure of annotation material, the method including the steps of: collecting a group of documents; determining a group of annotations (snippets) referencing the group of documents; forming a snippet dictionary containing one entry for every distinct snippet encountered, in which each entry references the segment of the snippet index relevant to that snippet; and forming a snippet index comprising lists of documents tagged by each distinct snippet and, ideally, the assigned document weights attributable to that annotation. Preferably, the entries are stored in the snippet index in document number difference order.

Preferably, the method further includes: for the group of annotations, forming a word dictionary containing one entry for every distinct word encountered in the set of annotations, in which each entry references the segment of the word index relevant to that word; and forming a word index comprising lists of identifiers identifying annotations containing each distinct word.

In accordance with a second aspect of the present invention, there is provided a system for encoding an inverted list structure of annotation material, the system comprising one or more processors adapted to perform a method as previously described.

The processor is preferably coupled to a data network for receiving input for the method and sending output of the method.

In accordance with a third aspect of the present invention, there is provided a computer-readable carrier medium carrying a set of instructions that when executed by one or more processors cause the one or more processors to carry out a method of encoding an inverted list structure of annotation material as previously described.

In accordance with a fourth aspect of the present invention, there is provided a computer program or computer program product comprising a set of instructions for carrying out a method of encoding an inverted list structure of annotation material as previously described.

BRIEF DESCRIPTION OF THE DRAWINGS

A preferred embodiment of the invention will now be described, by way of example only, with reference to the accompanying drawings in which.

DESCRIPTION OF PREFERRED AND OTHER EMBODIMENTS

Figure 1:
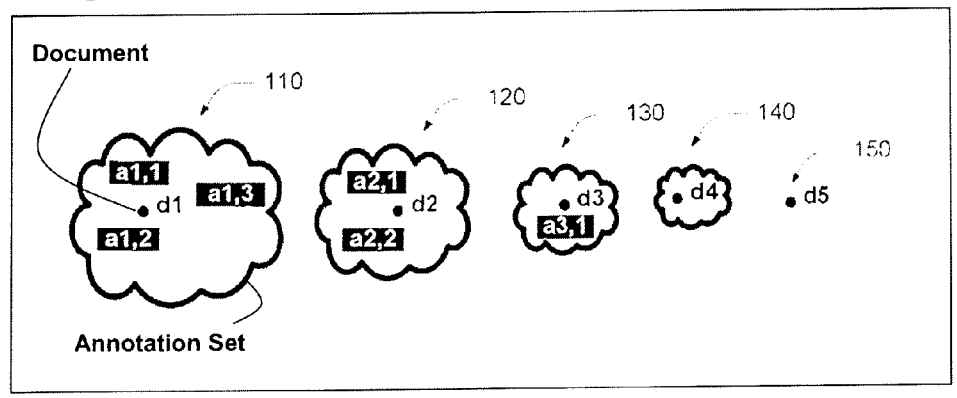
FIG. 1 illustrates the document and annotation set concept.

In the preferred embodiment, there is provided an efficient method of searching documents by their annotations. An annotation index is developed for use in a similar manner as a keyword inverted index.

External textual annotations, such as anchortext, click-implied descriptions, and popularly assigned tags, are now commonly used as part of the indexing process of relative document value ranking. Unlike words from the document itself, they reflect a diversity of views (not just those of the author), and are capable of providing indicators of the "popularity" of the document. Unlike static ranking evidence such as PageRank, the popularity can be query-dependent.

Further, in some instances or alternative embodiments, other information can be treated as annotations. For example, author/publisher assigned information can be treated as annotations. For example, document titles, metadata tags and even URL words. Further, either a combined index or separate indexes can be kept for interrogation.

External annotations can be actually or logically concatenated into surrogates for the documents themselves, indexed using a standard inverted file structure, and scored using a standard relevance scoring function. Alternatively, they may be logically appended to the actual text of the document as pseudo-fields of the document.

Several features of external annotations allow for an improved design, these include, per-annotation weighting, a need for efficient processing of high-frequency annotations, problem of matching very short documents, degrees of match, phrase and proximity matches, and index compression. These topics are discussed in more detail below.

Per-annotation weighting: It is potentially advantageous to assign different weights to different occurrences of the same annotation, depending upon circumstances, as illustrated in the following examples:

The anchortext associated with inter-host links can receive higher weight than is the case for within-host links.

Frequently repeated anchortext associated with links whose source and target URL patterns suggest that they have been generated automatically by a Web publishing system, should receive a lower weight.

Alternatively, or in addition, it may be desirable to weight the anchortext by the static rank (e.g. PageRank) of the source page.

It may be useful to apply trust-bias compensation to click implied descriptions.

The weights assigned to click implied descriptions may be reduced by a factor increasing with the time elapsed since the click, to increase the influence of recent clicks.

It may be effective to weight folksonomy-style tags by some estimate of authority or reliability of the tagger.

A model is needed which is capable of weighting annotations on a per-annotation basis. This requires an extension beyond those provided in previous models.

Need for efficient processing of high-frequency annotations: The same annotation may be applied with very high frequency to certain documents. An alternative inverted file format may allow substantial speed-up of processing in these cases.

Problem of matching very short documents: It should be noted that the bag-of-words model of documents and queries is less appropriate when matching queries against external annotations. It has previously been reported that Web search queries are on average only 2.35 words long. Obviously click-implied descriptions may be expected to be the same length. By way of testing, 46 million anchortext annotations extracted from a collection of Australian government sites showed an average length of 2.49 words and anchortext annotations from 257 million links within the TREC GOV2 test corpus averaged 2.56 words.

Degrees of match: It is desirable to provide a capability of computing a degree of match for a query against whole annotations, rather than to undifferentiated annotation words. For example, it often happens that a query is a partial match to a frequently repeated annotation. For example, the query 'map' partially matches the 'site map' anchor text repeated frequently due to a navigation template on a website. Examples occur frequently enough: 'president' v. 'vice-president', 'star' v. 'star wars'.

Phrase and proximity matches: A higher degree of match may be scored when a phrase in the query matches a phrase in an annotation or when query words occur in close proximity in an annotation. By restricting phrase and proximity matching to within annotations, false matches typical of the document surrogate methods are avoided.

Index compression: Index compression is a desirable attribute and possibly needed for efficiency. 'Vbyte' encoding as disclosed by Falk Scholer, Hugh E. Williams, John Yiannis, and Justin Zobel, "Compression of inverted indexes for fast query evaluation" (*Proceedings of ACM SIGIR '2002*, pages 222-229) is reasonably space economical, fast to encode/decode, and simple to describe. Its utilization in a preferred embodiment is assumed.

A Method for Ranking Documents for Retrieval Using Annotations

Referring to FIG. 1, by way of example only, another way of describing the problem is that for each document $d_i$ (by way of example represented as 110, 120, 130, 140 and 150), a set of annotations $a_{ij}$ (also known as clouds) exist. These annotation sets can vary in both number and diversity of annotation labels. Each $a_{ij}$ is associated with a weight $w(a_{ij})$ which can be a simple count of the number of times this annotation has been applied to this document or, alternatively, can be something more complex, reflecting factors such as those listed previously.

In an embodiment, A similarity score $S(q,a)$ can be computed between a query 'q' and an annotation 'a' using one of a wide range of similarity functions.

Similarity Functions for Queries and Annotations

In an embodiment, an approach is to treat a query and annotations as bags of words and compute a vector space similarity or probabilistic weights.

In an alternative embodiment, a number of word-level similarity functions are possible and have the desirable property of attaining a maximum when there is an exact match between query and annotation. An example of such a function can be expressed as follows:

$$Jaccard(q, a) = \frac{|words(q) \cap words(a)|}{|words(q) \cup words(a)|}$$

It would be appreciated that a similarity function can also be computed using word stems or n-grams rather than words.

It would also be appreciated that various alternatives are also possible, including any form of edit distance. The result of the chosen similarity function may be modulated by a step function or a multi-step function.

A non-zero similarity may exist between a query and an annotation even if they share no words in common. For example 'Myanmar' and 'Burma' might be considered a very close match. It is envisaged that similarity functions capable of recognising such similarities would be based on search-engine log analysis, for example as reported by Jones, Rey, Madani and Greiner (Proceedings of WWW'06 conference. ACM Press, New York. pages 387-396). or on co-occurrences of snippets within a corpus.

Assigning Document Scores for Purposes of Ranked Retrieval Using Query-Annotation Similarities By way of example only, an annotation retrieval score for a document is determined by the annotations applied to it that are considered to match the query—the matching annotations. All annotations applied to a document for which $S(q, a) > T$, where T is a threshold such as zero, may be considered to be matching annotations. Alternatively, by way of example, only the n most similar may be considered to be matching annotations.

According to an embodiment, a document's annotation score component due to a particular matching annotation can be calculated by combining $S(q, a_{ij})$ with the relevant weight $w(a_{ij})$, typically by taking their product. A document's overall annotation score can then be calculated as the sum of the annotation score components due to all the matching annotations.

It would be appreciated that overall annotation scores may be further combined with other scores including document-query similarity and query-independent scores such as PageRank.

A Simple Inverted File Format for Annotations

In an alternative embodiment, an inverted file format for annotations can be created. This inverted file format will be discussed by way of reference to an example based on the arrangement shown in FIG. 1.

In this embodiment, a separate surrogate document can be formed (either actually or conceptually) by concatenating the external text annotations together in the one document.

Figure 2:
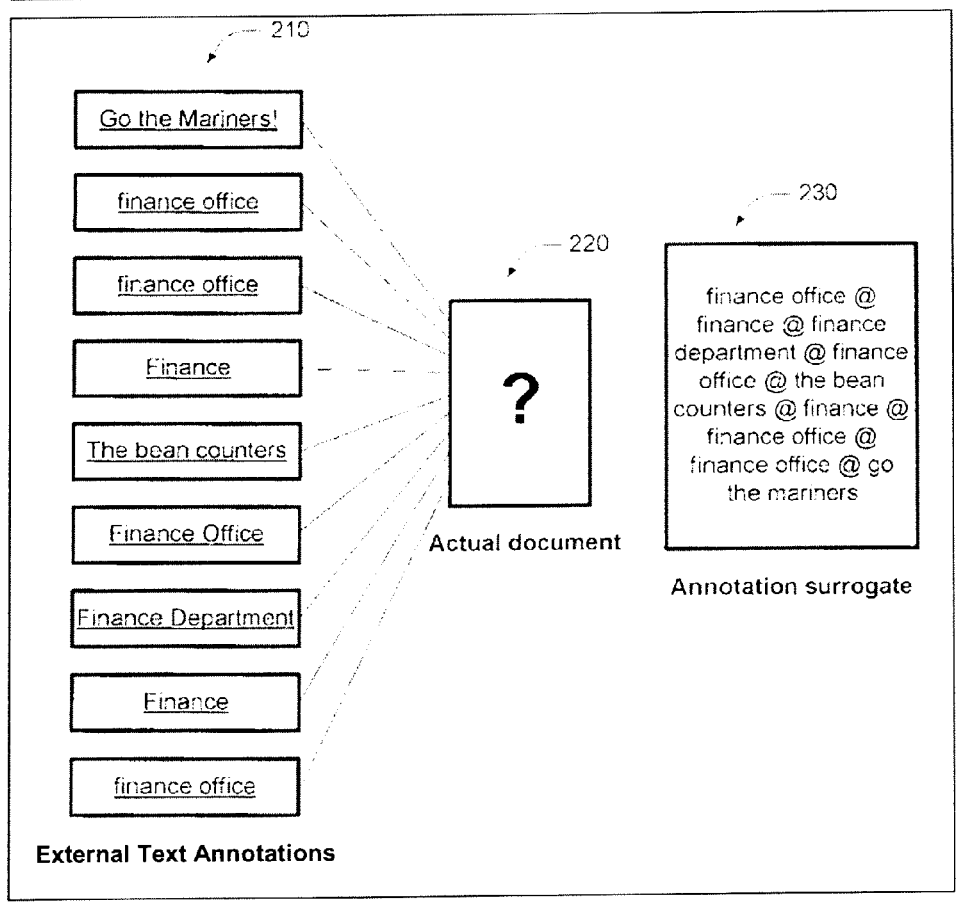
FIG. 2 illustrates the virtual document surrogate formation process.

Referring to FIG. 2, by way of example only, a simple example of this process is shown for the arrangement of FIG. 1. In this example, all the external text annotations 210 to a document 220 are concatenated together in to an "annotation surrogate" document 230. The '@' symbol represent a marker inserted in the text to prevent false phrase matching across annotation boundaries. They are not indexed but cause a word-position counter to be incremented by one.

A simple inverted file postings list structure capable of supporting phrase and proximity queries consists of a sequence of 2-tuples (docid;word-position). An example, postings relating to document d in FIG. 2, under this example first method could be:

bean (d;12)
  counters (d;13)
  department (d;6)
  finance (d;0)(d;3)(d;5)(d;8)(d;15)(d;17)(d;20)
  go (d;23)
  mariners (d;25)
  office (d;2)(d;10)(d;19)(d;22)
  the (d;11)(d;24)

In practice, it is preferable that postings are stored in document-number order and both the sequence of document numbers and the sequence of word-positions within a document is likely to be stored as differences to improve compression. Thus, the postings for 'office' in the above example can be represented as:

($\Delta$;2)(0;8)(0;9)(0;3)

and compressed. In this method, phrases and proximities can be supported by intersecting postings lists, and false phrases (but not false proximity relations) are suppressed by double incrementing the word position at each boundary between annotations.

In another embodiment, this basic method may be augmented with weights. However it would be appreciated that an increased demand on memory space in using weights may be considerable. In the following example, only one weight '$w_1$' is stored for a document d. In alternative embodiments multiple weights ($w_1$; : : : ; $w_n$) might actually be recorded in each posting for allowing customisation or tuning of the ranking formula at query processing time.

A refined method will now be shown by way of example only. Postings relating to document d can be represented by a sequence of 3-tuples (docid;word-position;weight), for example, as bean (d;12;w1)
  counters (d;13;w1)
  department (d;6;w1)
  finance (d;0;w1)(d;3;w1)(d;5;w1)(d;8;w1)(d;15;w1)(d;17;w1)(d;20;w1)
  go (d;23;w1)
  mariners (d;25;w1)
  office (d;2;w1)(d;10;w1)(d;19;w1)(d;22;w1)
  the (d;11;w1)(d;24;w1)

Improvement 1

In an embodiment, by way of example and without loss of generality, it is possible to use the weights stored in postings to accumulate contributions from multiple term occurrences. To improve the benefit from this, taking into account that the "annotation surrogate" document is not real text, it is possible to identify all the distinct annotations (after case folding and punctuation removal) and store each of them only once, each with a repetition count:

(finance office)4 @(finance)2 @(finance department)1 @(the bean counters)1 @(go the mariners)1

It would be appreciated that this technique can significantly reduce the length of the longest postings lists, thereby reducing space requirements and reducing processing time. Phrases and proximities are still supported and false phrases rejected. Through elimination of the 3 additional occurrences of 'finance office' and one of 'finance', plus 4 inter-annotation gaps, the maximum word position in the surrogate is now 14 rather than 25. In practical cases with thousands of annotations, reductions in word-position values can translate to useful increases in compression efficiency.

It would be appreciated that, while the order of words within an annotation is significant, the order of annotations in the surrogate need not be preserved. By re-ordering annotations in order of decreasing frequency of occurrence within the surrogate (as shown above), the reduction in word-position values is maximized, thereby leading to example Method 3:

bean (d;9;1)
  counters (d;10;1)
  department (d;6;1)
  finance (d;0;4)(d;3;2)(d;5;1)
  go (d;12;1)
  mariners (d;14;1)
  office (d;1;4)
  the (d;8;1)(d;12;1)

In this example method the third component of each posting (weight=w1) is a simple occurrence count.

Improvement 2

The time taken to process the longest postings lists (particularly when matching phrases) can be reduced, at the acceptable expense of increased space for shorter lists, by grouping adjacent postings relating to the same document and including additional information to enable the rest of the group to be skipped without decompressing. The additional items are $b_i$, the number of bytes in the rest of the group and c, the number of postings within the group. This leads to a Method 4, which by way of example can have postings relating to document d as:

bean (d;b1;1(9;1))
  counters (d;b2;1(10;1))
  department (d;b3;1(6;1))
  finance (d;b4;3(0;4)(3;2)(5;1))
  go (d;b5;1(12;1))
  mariners (d;b6;1(14;1))
  office (d;b7;1(1;4))
  the (d;b8;2(8;1)(12;1))

It would be appreciated that, in this example, the weight w1 is again a simple occurrence count.

A Two-Level Index Structure

The above refinement can be combined into a two-level index structure.

Figure 3:
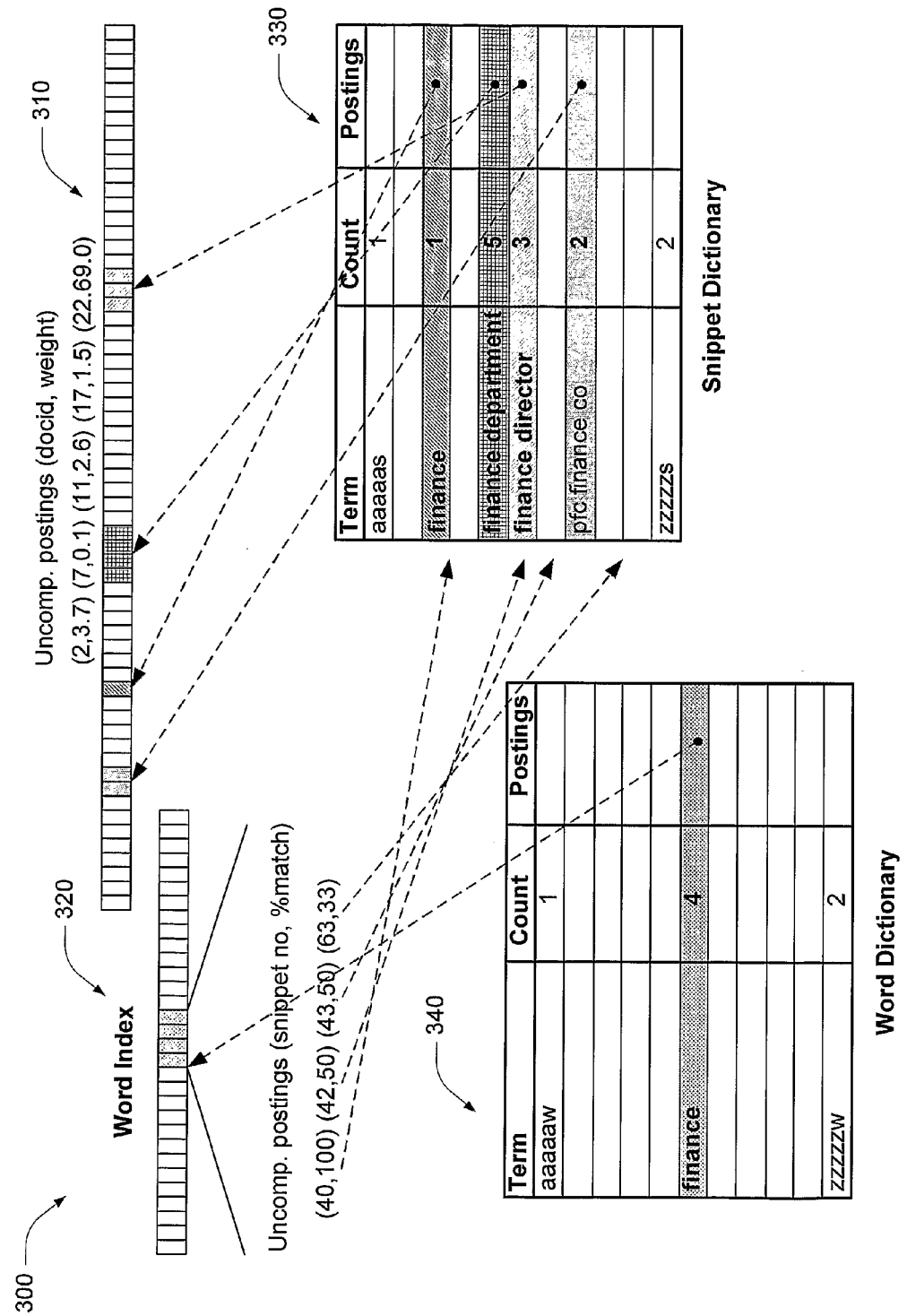
FIG. 3 illustrates a two level annotation index utilised in the preferred embodiment.

Referring to FIG. 3, by way of example only, there is shown an alternative method employing a two level index structure 300. A snippet index 310 is used to index documents and a word index 320 indexes the snippets. The snippet index would naturally incorporate the main improvement of Method 4—grouping multiple annotations for a single document into a single posting with aggregated weight. This structure can be quite compact because there is no need for position information. It also allows very efficient and precise determination of phrase and proximity matches.

In this example, a snippet dictionary 330 contains one entry for each distinct annotation snippet, and postings in the snippet index 310 reference documents tagged by a particular snippet and include one or more weights (one shown here). A word dictionary 340 contains an entry for each distinct word used in annotations, and postings in the word index reference entries in the annotation dictionary and include a degree of match weight between the word and the snippet.

Continuing the example from FIG. 2, the two-part index can be represent as:

Part 1
(0) finance (d;2)
(1) finance department (d;4)
(2) finance office (d;1)
(3) go the mariners (d;1)
(4) the bean counters (d;1)

Part 2
bean (4)
counters (4)
department (1)
finance (0)(1)(2)
go (3)
mariners (3)
office (2)
the (3)(4)

In this example, the method provides a compact and easily accessible storage arrangement is provided which allows for effective index searching of annotations.

Figure 4:
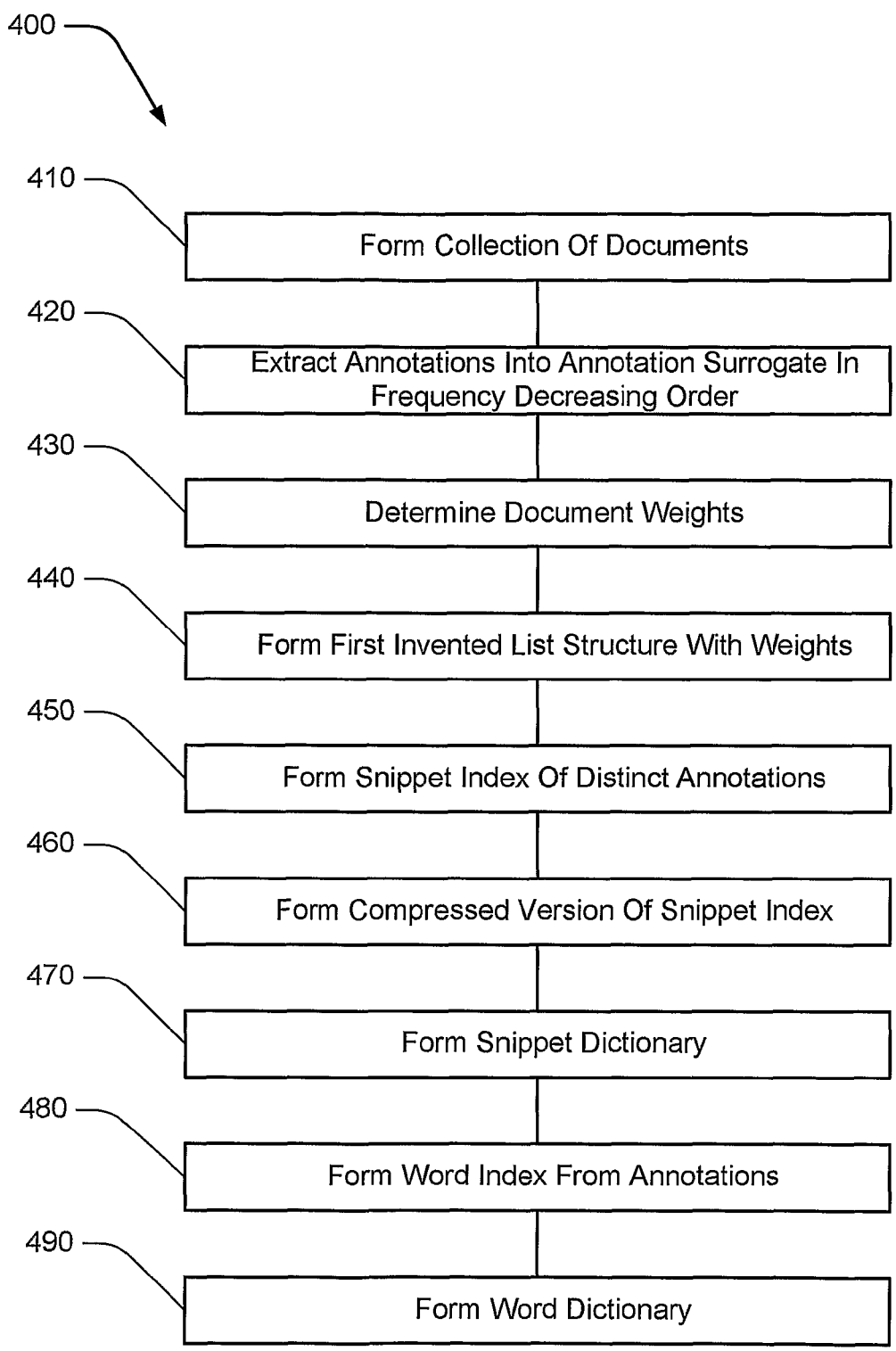
FIG. 4 illustrates a method for indexing and retrieval according to a preferred embodiment.

Referring to FIG. 4, a method according to a preferred embodiment can proceed in accordance with the steps 400. By way of example only, these steps can include:

A large volume of material for indexing is initially collected. This can be done by searching a portion of the Internet or other large database such as a library catalog or shared hard drive. The data is traversed including all appropriate links and the results stored 410;

The annotations relating to each document are identified and stored in a frequency decreasing order 420;

A determination of likely document weights is made (using standard prior art techniques) 430;

Next, a first inverted list structure is formed with weights 440;

The snippet index of distinct annotations is then formed 450;

A compressed version of the snippet index is then formed 460;

From the snippet index, a snippet dictionary is formed 470;

Subsequently, the word index is formed from the list of annotations 480; and

From the word index, a word dictionary is formed 490.

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Figure 5:
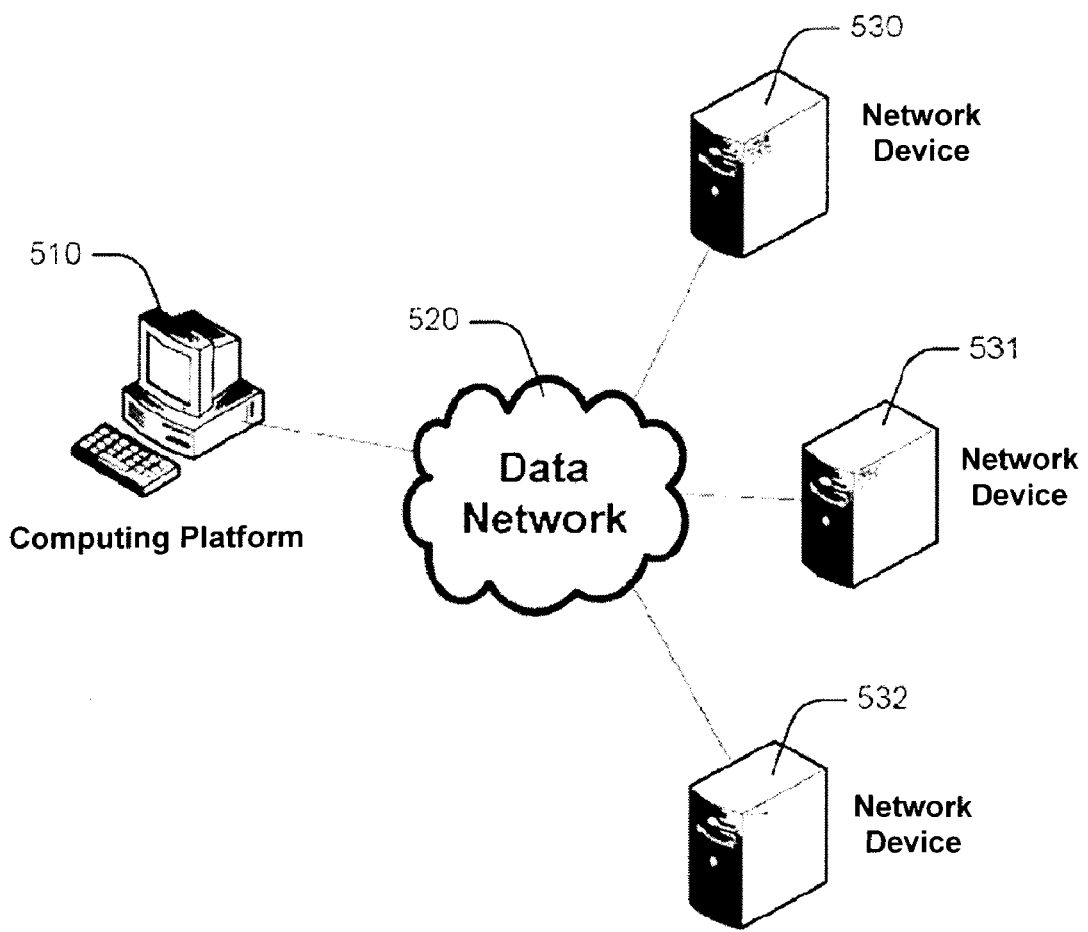
FIG. 5 illustrates a system for indexing and retrieval according to a preferred embodiment.

Referring to FIG. 5, by way of example only, a system schematic for indexing and retrieval according to a preferred embodiment is shown. This system includes a computing platform 510 having one or more processors and being in a networked deployment. The computing platform 510 is adapted to receive data associated with implementing a method described above, either from internal storage of from other network devices (for example 530, 531 or 534). The computing platform 510 is also adapted to index and retrieve either locally or remotely (using the network).

In an alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

While discussion of any prior art throughout the specification should in no way be considered as an admission that such prior art is widely known or forms part of common general knowledge, further information associated with embodiments of the present invention can be found in the following documents:

[1] Sergey Brin and Lawrence Page. The anatomy of a large-scale hypertextual Web search engine. In Proceedings of WWW7, pages 107-117, 1998. www7.scu.edu.au/programme/fullpapers/1921/com1921.htm.

[2] Nick Craswell, David Hawking, and Stephen Robertson. Effective site finding using link anchor information. In Proceedings of ACM SIGIR 2001, pages 250-257, New Orleans, 2001. www.ted.cmis.csiro.au/nickc/pubs/sigir01.pdf.

[3] David Hawking, Trystan Upstill, and Nick Craswell. Towards better weighting of anchors (poster). In Proceedings of SIGIR'2004, pages 99-150, Sheffield, England, July 2004. http://es.csiro.au/pubs/hawking_sigirposter04.pdf

[4] Thorsten Joachims, Laura Granka, Bing Pan, Helene Hembrooke, and Geri Gay. Accurately interpreting click-through data as implicit feedback. In Proc. ACM SIGIR '05, pages 154-161, 2005.

[5] O. McBryan. GENVL and WWWW: Tools for taming the web. In Proceedings of WWW1, 1994.

[6] Lawrence Page, Sergey Brin, Rajeev Motwani, and Terry Winograd. The pagerank citation ranking: Bringing order to the web. Technical report, Stanford, Santa Barbara, Calif. 93106, January 1998. dbpubs.stanford.edu:8090/pub/1999-66.

[7] Matthew Richardson, Amit Prakash, and Eric Brill. Beyond pagerank: Machine learning for static ranking. In Proceedings of WWW 2006, Edinburgh, 2006. www2006.org/programme/files/pdf/3101.pdf

[8] Stephen Robertson, Hugo Zaragoza, and Michael Taylor. Simple bm25 extension to multiple weighted fields. In CIKM '04: Proceedings of the thirteenth ACM international conference on Information and knowledge management, pages 42-49, New York, N.Y., USA, 2004. ACM Press.

[9] Falk Scholer, Hugh E. Williams, John Yiannis, and Justin Zobel. Compression of inverted indexes for fast query evaluation. In Proceedings of ACM SIGIR'2002, pages 222-229. ACM Press, 2002.

[10] Craig Silverstein, Monika Henzinger, Hannes Marais, and Michael Moricz. Analysis of a very large web search engine query log. SIGIR Forum, 33(1):6-12, 1999. Previously available as Digital Systems Research Center TR 1998-014 at www.research.digital.com/SRC.

[11] Rosie Jones, Benjamin Rey, Omid Madani and Wiley Greiner. Generating query substitutions. Proceedings of WWW'06 conference, pages 387-396. ACM Press, New York. 2006.

The foregoing describes preferred forms of the present invention. Modifications, obvious to those skilled in the art can be made thereto without departing from the scope of the invention.

The claims defining the invention are as follows:

1. A method of encoding on a computer system for information retrieval an inverted list structure of annotation material, the method comprising:
   collecting a group of documents and storing the group of documents in a digital format;
   determining a group of external annotations referencing the group of documents;
   forming a snippet index by grouping the group of external annotations by unique annotation identifier;
   forming a snippet dictionary which, for each unique annotation identifier, indexes a corresponding position in the snippet index for the group of external annotations having that unique annotation identifier;
   computing a similarity score between a user query and document annotations utilizing a similarity function; and
   utilizing the similarity function to rank the relevant documents,
   wherein annotation relevance weightings are stored with the annotations in said snippet index, wherein the same annotation may be applied with high frequency to certain documents and wherein multiple annotations for a single document are grouped into a single annotation identifier with aggregated weight.

2. A method as claimed in claim 1 further comprising:
   for the group of external annotations, forming a word index by grouping the words within the group of external annotations; and forming a series of corresponding annotation identifiers within the snippet dictionary which contain the word.

3. A method as claimed in claim 2 further comprising forming a word dictionary indexing the words within said word index.

4. A method as claimed in claim 1 wherein entries are stored in the snippet index in document number difference order.

5. A method as claimed in claim 1 wherein annotations within the snippet index are stored in decreasing order of frequency of occurrence.

6. A method as claimed in claim 1 further comprising:
inputting a user search query;
utilizing the snippet index to determine documents relevant to said query.

7. A method as claimed in claim 6 wherein said similarity function includes a Jaccard function on the words within the query and annotation.

8. A method as claimed in claim 7 wherein said similarity function is modulated by a multi-step function.

9. A method as claimed in claim 6 wherein the similarity function is modulated by an indicative weight corresponding to a document's perceived importance.

10. A system for encoding an inverted list structure of annotation material, the system comprising one or more processors configured to perform a method, the method comprising:
collecting a group of documents and storing the group of documents in a digital format;
determining a group of external annotations referencing the group of documents;
forming a snippet index by grouping the group of external annotations by unique annotation identifier;
forming a snippet dictionary which, for each unique annotation identifier, indexes a corresponding position in the snippet index for the group of external annotations having that unique annotation identifier;
computing a similarity score between a user query and document annotations utilizing a similarity function; and
utilizing the similarity function to rank the relevant documents,
wherein annotation relevance weightings are stored with the annotations in said snippet index, wherein the same annotation may be applied with high frequency to certain documents and wherein multiple annotations for a single document are grouped into a single annotation identifier with aggregated weight.

11. A system according to claim 10 wherein said processor is coupled to a data network for receiving input for the method and sending output of the method.

12. A computer-readable storage medium carrying a set of instructions that when executed by one or more processors cause the one or more processors to carry out a method of encoding an inverted list structure of annotation material, the method comprising:
collecting a group of documents and storing the group of documents in a digital format;
determining a group of external annotations referencing the group of documents;
forming a snippet index by grouping the group of external annotations by unique annotation identifier;
forming a snippet dictionary which, for each unique annotation identifier, indexes a corresponding position in the snippet index for the group of external annotations having that unique annotation identifier;
computing a similarity score between a user query and document annotations utilizing a similarity function; and
utilizing the similarity function to rank the relevant documents,
wherein annotation relevance weightings are stored with the annotations in said snippet index, wherein the same annotation may be applied with high frequency to certain documents and wherein multiple annotations for a single document are grouped into a single annotation identifier with aggregated weight.

13. A system for encoding an inverted list structure of annotation material, the system comprising one or more processors configured to perform a method, the method comprising:
collecting a group of documents and storing the group of documents in a digital format;
determining a group of external annotations referencing the group of documents;
forming a snippet index by grouping the group of external annotations by unique annotation identifier;
forming a snippet dictionary which, for each unique annotation identifier, indexes a corresponding position in the snippet index for the group of external annotations having that unique annotation identifier;
computing a similarity score between a user query and document annotations utilizing a similarity function; and
utilizing the similarity function to rank the relevant documents,
wherein annotation relevance weightings are stored with the annotations in said snippet index, wherein the same annotation may be applied with high frequency to certain documents and wherein multiple annotations for a single document are grouped into a single annotation identifier with aggregated weight.

14. A method as claimed in claim 1 wherein the annotations referencing the group of documents are external textual annotations.

15. A method as claimed in claim 14 wherein the external textual annotations comprise one or more of anchortext, click-implied descriptions, popularly assigned tags, document titles, metadata tags, or URL words.

16. A method as claimed in claim 1 wherein different annotation relevance weightings are assigned to different occurrences of the same annotation, wherein the annotation relevance weightings are determined according to one or more of:
the anchortext associated with links of inter-host and within-host links;
the anchortext of manual or automatically generated links;
the static rank of the source page comprising anchortext;
trust bias compensation of click implied descriptions;
the time elapsed since a click; or
the authority or reliability of a creator of folksonomy-style tag.

* * * * *